(12) United States Patent
Tsai et al.

(10) Patent No.: US 11,465,625 B2
(45) Date of Patent: Oct. 11, 2022

(54) TRAFFIC SAFETY CONTROL METHOD, VEHICLE-MOUNTED DEVICE AND READABLE STORAGE MEDIUM

(71) Applicant: Mobile Drive Technology Co., Ltd., New Taipei (TW)

(72) Inventors: Hsien-Chi Tsai, New Taipei (TW); Chun-Yu Chen, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 70 days.

(21) Appl. No.: 16/868,943

(22) Filed: May 7, 2020

(65) Prior Publication Data

US 2021/0300370 A1    Sep. 30, 2021

(30) Foreign Application Priority Data

Mar. 24, 2020    (CN) .......................... 202010215214.6

(51) Int. Cl.
*B60W 30/18* (2012.01)
*B60W 30/095* (2012.01)
*B60W 40/06* (2012.01)
*B60W 10/18* (2012.01)
*G06V 20/56* (2022.01)

(52) U.S. Cl.
CPC ...... *B60W 30/18154* (2013.01); *B60W 10/18* (2013.01); *B60W 30/0953* (2013.01); *B60W 30/0956* (2013.01); *B60W 40/06* (2013.01); *G06V 20/56* (2022.01); *B60W 2552/05* (2020.02); *B60W 2554/80* (2020.02); *B60W 2556/40* (2020.02)

(58) Field of Classification Search
CPC ........... B60W 30/18154; B60W 10/18; B60W 30/09; B60W 30/0953; B60W 30/0956; B60W 40/06; B60W 2556/40; B60W 2554/80; B60W 2552/05; B60W 60/0027; B60W 60/00276; B60W 30/18159; B60W 2420/42; B60W 2520/10; B60W 2554/40; B60W 2554/4048; B60W 2554/801; B60W 2554/802; B60W 2556/50; B60W 2710/182; G06K 9/00791; G06V 20/56; B60R 1/00; B60R 2300/207; B60R 2300/804; B60T 7/22

See application file for complete search history.

(56) References Cited

U.S. PATENT DOCUMENTS 9,873,376 B2 *    1/2018   Matsuno .............. B60T 8/17616
9,981,658 B2 *    5/2018   Ichikawa .............. B60W 30/09
(Continued)

FOREIGN PATENT DOCUMENTS

CN    110053595 A  *  7/2019   ............ B60T 13/686
CN    110816531 A  *  2/2020
(Continued)

*Primary Examiner* — Angelina Shudy
(74) *Attorney, Agent, or Firm* — ScienBiziP, P.C.

(57) ABSTRACT

A traffic safety control method is provided. The method includes obtaining first related information of a road when a vehicle is traveling on a road. Second related information is detected using a detecting device of the vehicle when the first related information indicates that there is the intersection in front of the vehicle on the road. The vehicle is controlled according to the first related information and the second related information.

17 Claims, 5 Drawing Sheets

(56) References Cited

U.S. PATENT DOCUMENTS

| | | | | |
|---|---|---|---|---|
| 10,525,975 | B2* | 1/2020 | Krabot | B60W 30/18145 |
| 11,254,311 | B2* | 2/2022 | Chow | B60W 30/162 |
| 2010/0094509 | A1* | 4/2010 | Luke | B60W 40/02 |
| | | | | 342/52 |
| 2011/0082623 | A1* | 4/2011 | Lu | B60W 10/06 |
| | | | | 701/41 |
| 2014/0214255 | A1* | 7/2014 | Dolgov | G05D 1/0248 |
| | | | | 701/23 |
| 2015/0002284 | A1* | 1/2015 | Matsuno | B60T 8/17616 |
| | | | | 340/435 |
| 2016/0016560 | A1* | 1/2016 | Parker | B60T 7/22 |
| | | | | 701/70 |
| 2016/0368492 | A1* | 12/2016 | Al-Stouhi | G08G 1/166 |
| 2017/0072926 | A1* | 3/2017 | Fukuda | B60W 10/04 |
| 2017/0080941 | A1* | 3/2017 | Ono | B60W 30/143 |
| 2017/0287338 | A1* | 10/2017 | Neubecker | G08G 1/162 |
| 2018/0082587 | A1* | 3/2018 | Wan | B60Q 1/503 |
| 2018/0164107 | A1* | 6/2018 | Yalla | G01C 21/3461 |
| 2018/0211530 | A1* | 7/2018 | Sarkar | G08G 1/09623 |
| 2018/0326995 | A1* | 11/2018 | Hiramatsu | B60W 30/18154 |
| 2019/0023273 | A1* | 1/2019 | Ishioka | G08G 1/16 |
| 2019/0061766 | A1* | 2/2019 | Nishiguchi | B60W 30/18163 |
| 2019/0152525 | A1* | 5/2019 | Resch | G01C 21/34 |
| 2019/0179331 | A1* | 6/2019 | Heo | G01C 21/3673 |
| 2019/0248381 | A1* | 8/2019 | Yu | B60W 30/0953 |
| 2020/0074863 | A1* | 3/2020 | Jung | B60W 30/09 |
| 2020/0176029 | A1* | 6/2020 | Yamada | G06K 9/00791 |
| 2020/0406892 | A1* | 12/2020 | Yu | B60W 30/0953 |
| 2021/0064041 | A1* | 3/2021 | Kim | G05D 1/0212 |
| 2021/0078599 | A1* | 3/2021 | Yu | B60W 50/0205 |
| 2021/0171042 | A1* | 6/2021 | Hayakawa | B60W 40/04 |
| 2021/0197821 | A1* | 7/2021 | Valchok | B60W 60/00276 |
| 2021/0239799 | A1* | 8/2021 | Friend | G05D 1/024 |
| 2021/0276561 | A1* | 9/2021 | Hayakawa | B60W 30/18163 |
| 2021/0300345 | A1* | 9/2021 | Sato | G08G 1/167 |
| 2022/0076037 | A1* | 3/2022 | Hochman | G05D 1/0246 |
| 2022/0144254 | A1* | 5/2022 | Weiss | B60W 10/20 |

FOREIGN PATENT DOCUMENTS

| | | | |
|---|---|---|---|
| CN | 110843773 A | 2/2020 | |
| CN | 111948738 A * | 11/2020 | |
| CN | 108806330 B * | 2/2021 | G08G 1/161 |
| CN | 112339761 A * | 2/2021 | B60Q 5/00 |
| CN | 112396857 A * | 2/2021 | |
| CN | 112455437 A * | 3/2021 | |
| DE | 102014219742 A1 * | 4/2015 | B60T 7/12 |
| DE | 102020120461 A1 * | 2/2021 | B60Q 5/00 |
| JP | 2006048494 A | 2/2006 | |
| JP | 2006260217 A * | 9/2006 | B60W 30/18154 |
| JP | 3894147 B2 * | 3/2007 | |
| JP | 4483472 B2 * | 6/2010 | |
| JP | 2021015459 A * | 2/2021 | B60W 30/09 |
| KR | 20170067343 A * | 6/2017 | |
| TW | 201030312 A1 | 8/2010 | |
| WO | WO-2016055183 A1 * | 4/2016 | B62D 15/029 |
| WO | WO-2020243484 A1 * | 12/2020 | B60W 30/18154 |

* cited by examiner

TRAFFIC SAFETY CONTROL METHOD, VEHICLE-MOUNTED DEVICE AND READABLE STORAGE MEDIUM

FIELD

The present disclosure relates to traffic safety control technology, in particular to a traffic safety control method, vehicle-mounted device, and readable storage medium.

BACKGROUND

Front Cross Traffic Alert (FCTA) can be used to prevent collisions at intersections. Specifically, the FCTA uses a radar sensor mounted on a vehicle to detect other vehicles coming from left or right in front of the vehicle, and prevent a collision according to the detection of other vehicles. However, during the implementation of the present disclosure, the inventor found that the FCTA includes disadvantages such as a limited detection range of the radar sensor, and the vehicle may not be able to stop safely if the vehicle is driving at a fast speed.

For example, referring to FIG. 1A, a vehicle 210 is driving on a main road 21 and a vehicle 220 is driving on a secondary road 22. The vehicle 220 and the vehicle 210 may collide at an intersection 200.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1A:
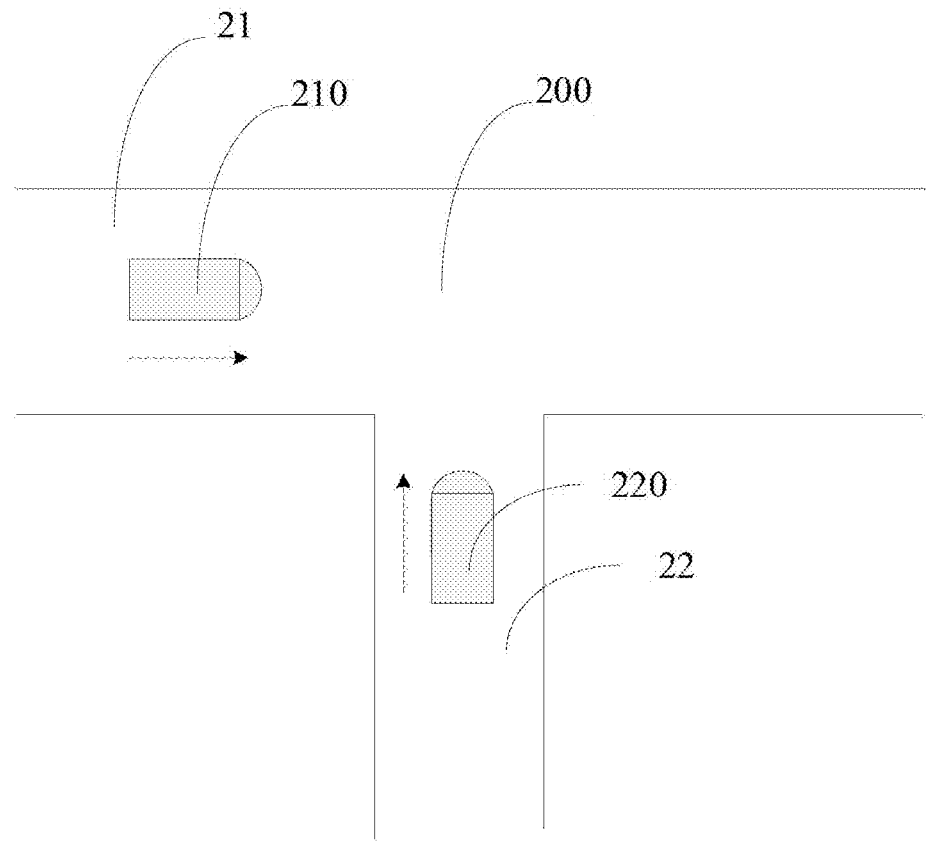
FIG. 1A illustrates an example of a collision scenario at an intersection.
Figure 1B:
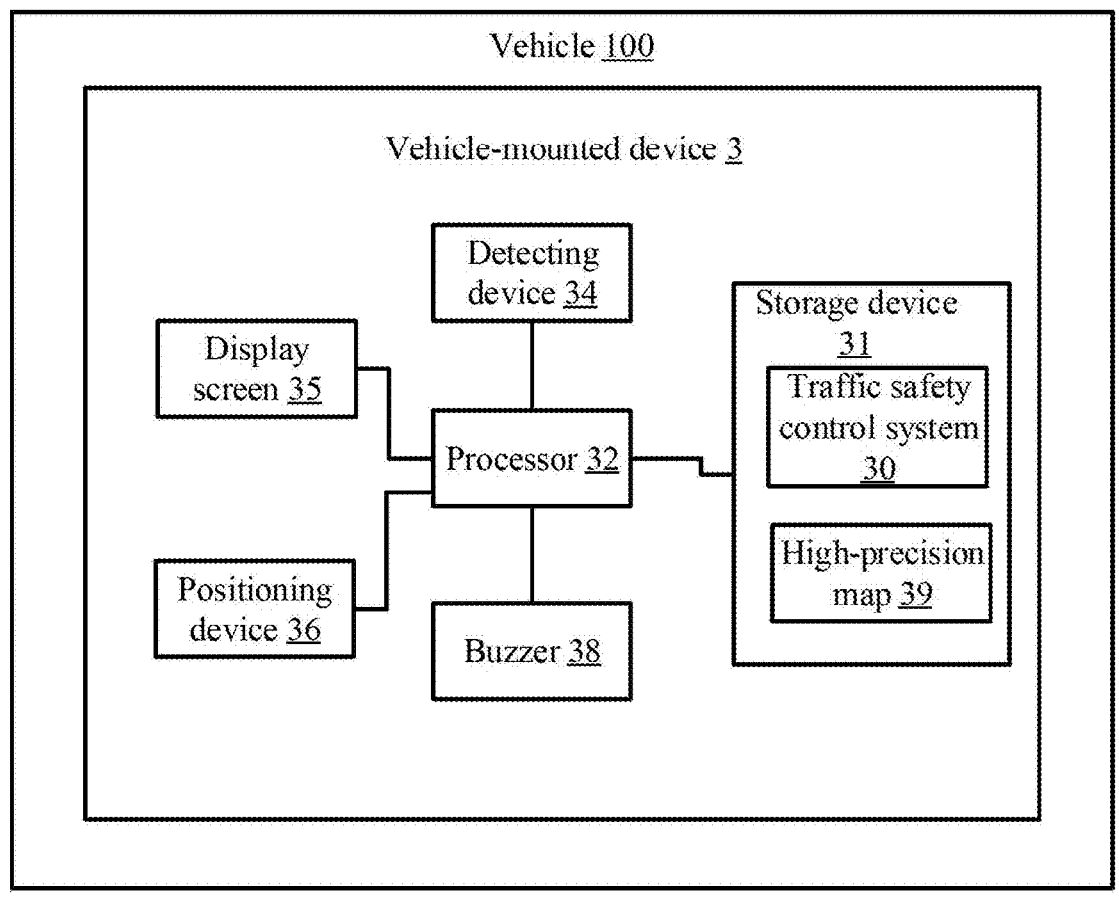
FIG. 1B illustrates a schematic diagram of a vehicle-mounted device according to one embodiment of the present disclosure.

FIG. 1B illustrates a schematic diagram of a vehicle-mounted device of the present disclosure.

In at least one embodiment, the vehicle-mounted device 3 is installed on a vehicle 100. The vehicle-mounted device 3 is essentially a vehicle-mounted computer. The vehicle-mounted device 3 includes a storage device 31, at least one processor 32, a detecting device 34, a display screen 35, a positioning device 36, and a buzzer 38. The above components are electronically connected to each other.

Those skilled in the art should understand that the structure of the vehicle-mounted device 3 shown in FIG. 1B does not constitute a limitation of the embodiment of the present disclosure. The vehicle-mounted device 3 can further include more or less other hardware or software than that shown in FIG. 1B, or the vehicle-mounted device 3 can have different component arrangements.

It should be noted that the vehicle-mounted device 3 is merely an example. If other kinds of vehicle-mounted devices can be adapted to the present disclosure, it should also be included in the protection scope of the present disclosure, and incorporated herein by reference.

In some embodiments, the storage device 31 may be used to store program codes and various data of computer programs. For example, the storage device 31 may be used to store a traffic safety control system 30 and a high-precision map 39 installed in the vehicle-mounted device 3, and implement high-speed and automatic completion of storing programs or data during operation of the vehicle-mounted device 3. The storage device 31 may include Read-Only Memory (ROM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit or can be composed of multiple packaged integrated circuits with the same function or different function. The at least one processor 32 includes one or more central processing units (CPUs), one or more microprocessors, one or more digital processing chips, one or more graphics processors, and various control chips. The at least one processor 32 is a control unit of the vehicle-mounted device 3. The at least one processor 32 uses various interfaces and lines to connect various components of the vehicle-mounted device 3, and executes programs or modules or instructions stored in the storage device 31, and invokes data stored in the storage device 31 to perform various functions of the vehicle-mounted device 3 and to process data, for example, perform a function of controlling traffic safety of the vehicle 100 (for details, see the description of FIG. 3).

In this embodiment, the detecting device 34 can be a light sensor, a visibility sensor, a camera, a radar sensor, or a combination thereof. The vehicle-mounted device 3 can use the detecting device 34 to detect a brightness value of an environment in which the vehicle 100 is located, a visibility value of the environment in which the vehicle 100 is located, and detect whether an object is in front of the vehicle 100, and detect a distance of the vehicle 100 from the object.

The display screen 35 can be a touch display screen for displaying various data of the vehicle-mounted device 3, such as displaying a user interface of a high-precision map 39. In this embodiment, the high-precision map 39 may be a map such as BAIDU high-precision map or other maps such as a GOOGLE high-precision map.

In this embodiment, the high-precision map 39 indicates location information corresponding to each road (such as latitude and longitude information along each road), a type of each road, intersections included in each road, location information corresponding to each intersection (such as latitude and longitude information corresponding to each intersection), whether each intersection is an accident-prone intersection, and so on.

In this embodiment, the type of the road indicates whether the road is a main road or a secondary road (the secondary road also can be named as a branch road or a side road). In this embodiment, the accident-prone intersection can be defined as an intersection where a number of traffic accidents are greater than a preset value (for example, 5, or 10). The high-precision map 39 has a record of the number of traffic accidents at each intersection, and records whether each intersection is the accident-prone intersection according to the number of traffic accidents.

In this embodiment, the positioning device 36 can be used to locate a position (such as longitude and latitude information) of the vehicle 100. In one embodiment, the positioning device 36 can be a Global Positioning System (GPS), an Assisted Global Positioning System (AGPS), a BeiDou Navigation Satellite. System (BDS), a global navigation satellite system (GLONASS), or a combination thereof.

In this embodiment, the traffic safety control system 30 can include one or more modules. The one or more modules are stored in the storage device 31, and are executed by at least one processor (e.g. processor 32 in this embodiment), such that a function of controlling traffic safety (for details, see the introduction to FIG. 3 below) is achieved.

Figure 2:
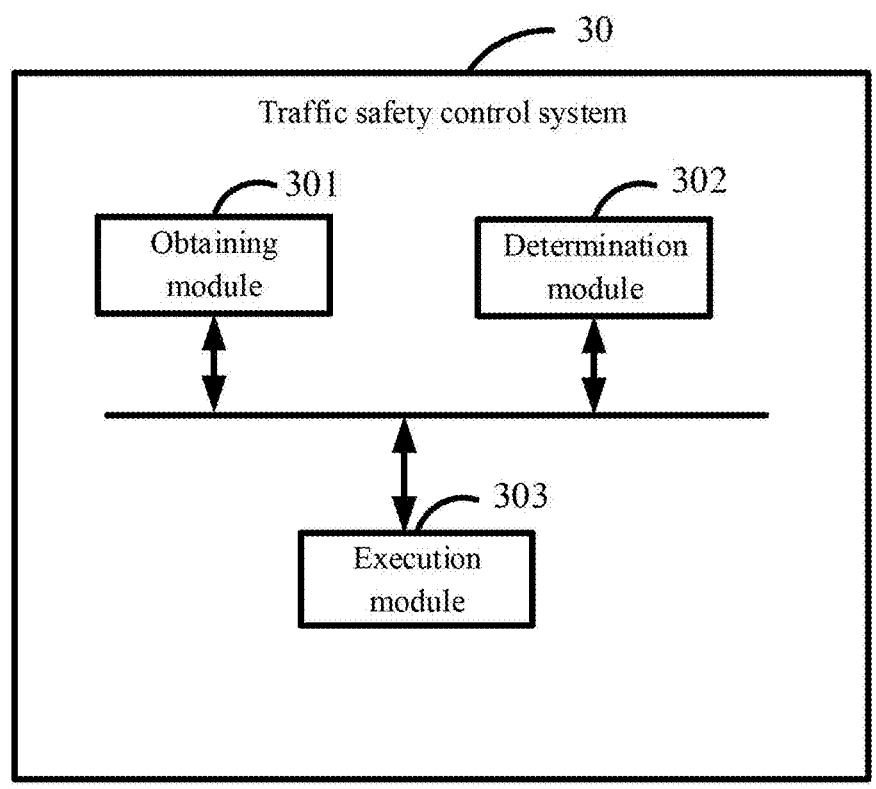
FIG. 2 shows one embodiment of modules of a traffic safety control system of the present disclosure.

In this embodiment, the traffic safety control system 30 can include a plurality of modules. Referring to FIG. 2, the plurality of modules includes an obtaining module 301, a determination module 302, and an execution module 303. The module referred to in the present disclosure refers to a series of computer-readable instructions that can be executed by at least one processor (for example, the processor 32), and can complete fixed functions, and can be stored in a storage device (for example, the storage device 31 of the vehicle-mounted device 3). In this embodiment, the functions of each module will be described in detail with reference to FIG. 3.

Figure 3:
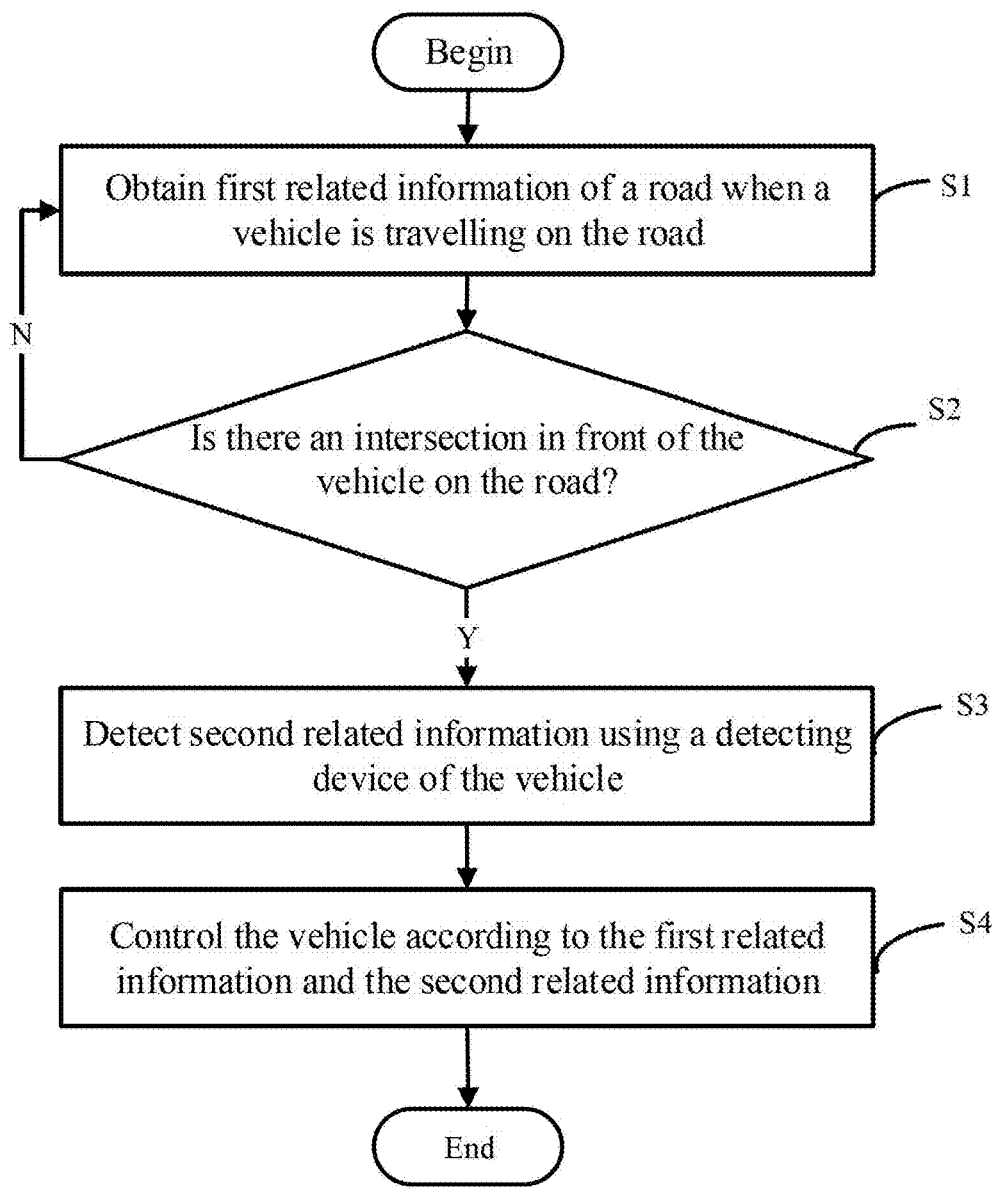
FIG. 3 shows a flow chart of one embodiment of a traffic safety control method of the present disclosure.

In this embodiment, an integrated unit implemented in a form of a software module can be stored in a non-transitory readable storage medium. The above modules include one or more computer-readable instructions. The vehicle-mounted device 3 or a processor implements the one or more computer-readable instructions, such that the method for controlling traffic safety shown in FIG. 3 is achieved.

In a further embodiment, referring to FIG. 2, the at least one processor 32 can execute an operating system of the vehicle-mounted device 3, various types of applications (such as the traffic safety control system 30 described above), program codes, and the like.

In a further embodiment, the storage device 31 stores program codes of a computer program, and the at least one processor 32 can invoke the program codes stored in the storage device 31 to achieve related functions. For example, each module of the traffic safety control system 30 shown in FIG. 2 is program code stored in the storage device 31. Each module of the traffic safety control system 30 shown in FIG. 2 is executed by the at least one processor 32, such that the functions of the modules are achieved, and a purpose of controlling the traffic safety (see the description of FIG. 3 below for details) is achieved.

In one embodiment of the present disclosure, the storage device 31 stores one or more computer-readable instructions, and the one or more computer-readable instructions are executed by the at least one processor 32 to achieve a purpose of controlling traffic safety. Specifically, the computer-readable instructions executed by the at least one processor 32 to achieve the purpose of controlling traffic safety is described in detail in FIG. 3 below.

FIG. 3 is a flowchart of a traffic safety control method according to a preferred embodiment of the present disclosure.

In this embodiment, the traffic safety control method can be applied to the vehicle-mounted device 3. For the vehicle-mounted device 3 that requires to control traffic safety of a vehicle, the vehicle-mounted device 3 can be directly integrated with the function of controlling the traffic safety. The vehicle-mounted device 3 can also achieve the function of controlling the traffic safety by running a Software Development Kit (SDK).

FIG. 3 shows a flow chart of one embodiment of a traffic safety control method. Referring to FIG. 3, the method is provided by way of example, as there are a variety of ways to carry out the method. The method described below can be carried out using the configurations illustrated in FIG. 1B, for example, and various elements of these figures are referenced in the explanation of the method. Each block is shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, when the vehicle 100 is traveling on a road, the obtaining module 301 obtains first related information of the road.

In one embodiment, the first related information of the road can include, but is not limited to, a type of the road, whether there is an intersection in front of the vehicle 100 on the road, and whether the intersection is the accident-prone intersection. In at least one embodiment, the front of the vehicle 100 can be defined to be a range that is within a preset distance (e.g., within 150 m, or 200 m) ahead of the vehicle 100 on the road.

In one embodiment, the obtaining module 301 can use the positioning device 36 and the high-precision map 39 to obtain the first related information of the road.

Specifically, the obtaining of the first related information of the road includes: obtaining a position coordinate of the vehicle 100 using the positioning device 36; locating a position of the vehicle 100 on the high-precision map 39 according to the position coordinate of the vehicle 100; and obtaining the first related information of the road from the high-precision map 39. As mentioned above, the high-precision map 39 indicates the type of the road, the intersections included in the road, whether the intersection is the accident-prone intersection, and so on.

In one embodiment, the obtaining module 301 can determine whether there is the intersection in front of the vehicle 100 on the road using the detecting device 34.

Specifically, the obtaining module 301 can capture an image of a scene in front of the vehicle 100 on the road using the detecting device 34 (as mentioned above, the detecting device 34 can be a camera). The obtaining module 301 can identify whether the captured image includes an image of a traffic light using an image recognition algorithm. The obtaining module 301 can determine that there is the intersection in front of the vehicle 100 on the road when the captured image includes the image of the traffic light; or can determine that there is no intersection in front of the vehicle 100 when the captured image does not include the image of the traffic light.

In this embodiment, the image recognition algorithm includes a template matching method. The obtaining module 301 can preset images of various types of traffic lights as templates. Therefore, the obtaining module 301 can use the template matching method to identify whether the captured image includes the image of a traffic light.

At block S2, the determination module 302 determines whether there is the intersection in front of the vehicle 100 on the road according to the first related information. When there is the intersection in front of the vehicle 100 on the road, the process goes to block S3. When there is no intersection in front of the vehicle 100 on the road, the process goes to block S1.

In one embodiment, when there is the intersection in front of the vehicle 100 on the road, and the intersection is the accident-prone intersection, the determination module 302 transmits a warning in a preset manner.

In one embodiment, the preset manner can refer to displaying text information on the display screen 35, and using the text information to warn a driver of the vehicle 100 that the intersection in front of the vehicle 100 on the road is the accident-prone intersection.

In other embodiments, the preset manner can further include controlling the buzzer 38 to generate a warning sound to warn the driver of the vehicle 100 that the intersection in front of the vehicle 100 is the accident-prone intersection.

In one embodiment, when the first related information indicates that there is the intersection in front of the vehicle 100 on the road, the execution module 303 further increases a detecting range of the detecting device 34. For example, the execution module 303 adjusts the detecting range of the detecting device 34 from a first range to a second range. The second range is wider than the first range. Such that the detecting range of the detecting device 34 can be longer and wider.

For example, after the execution module 303 increases a scanning range of the radar sensor, since the scanning range of the radar sensor is wider, a scanning result corresponding to a wider range can be obtained.

At block S3, when there is the intersection in front of the vehicle 100 on the road, the obtaining module 301 detects second related information using the detecting device 34 of the vehicle 100.

In one embodiment, the second related information includes, but is not limited to, the brightness value and the visibility value of the environment in which the vehicle 100 is located.

As described above, the detecting device 34 can be the light sensor, the visibility sensor, the camera, the radar sensor, or a combination thereof. Therefore, the obtaining module 301 can use the light sensor to detect the brightness value of the environment in which the vehicle 100 is currently located and/or use the visibility sensor to detect the visibility value of the environment in which the vehicle 100 is currently located.

At block S4, the execution module 303 controls the vehicle 100 according to the first related information and the second related information.

Figure 4:
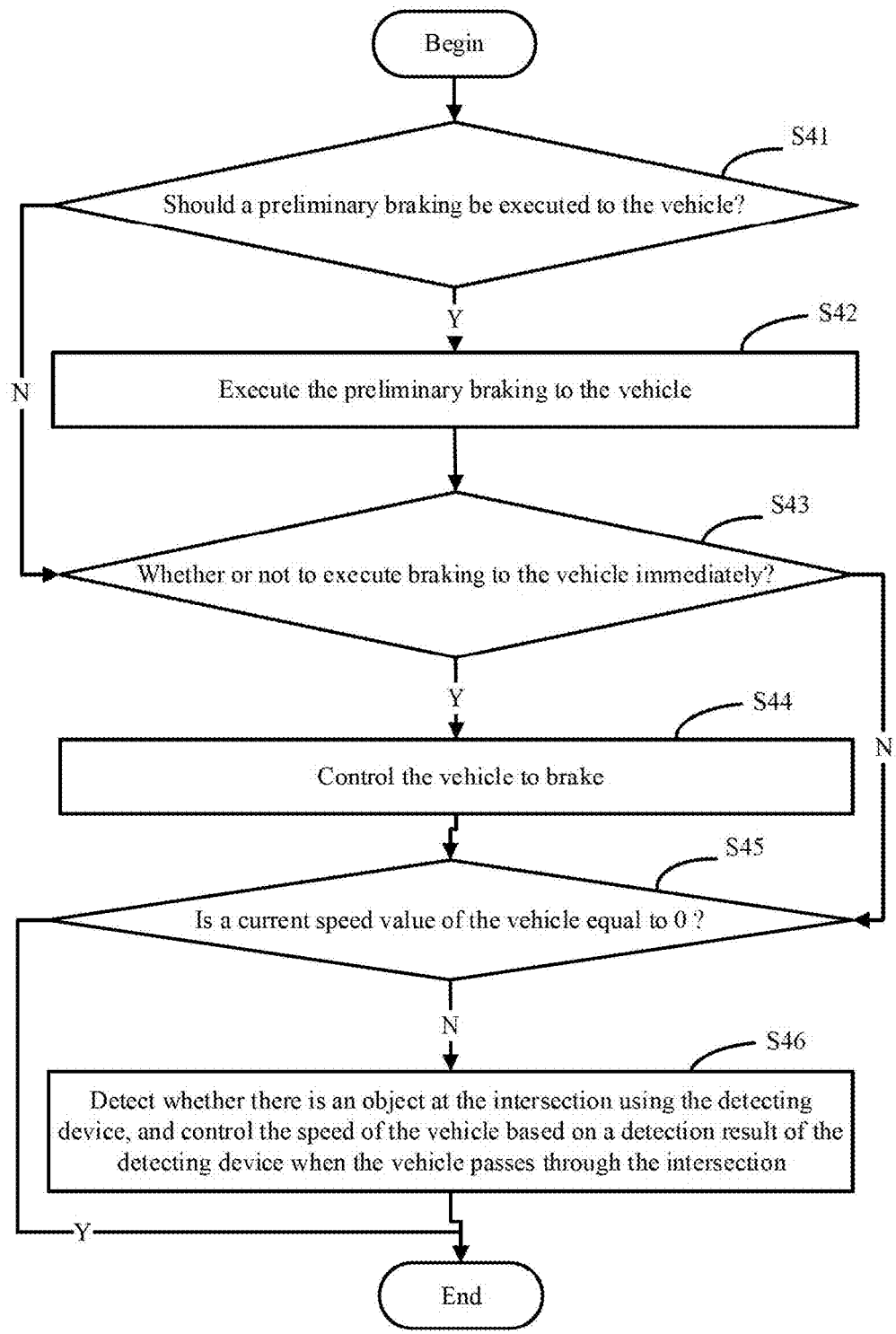
FIG. 4 illustrates a detailed flowchart of block S4 shown in FIG. 3.

In one embodiment, the controlling of the vehicle 100 according to the first related information and the second related information will be described below with reference to FIG. 4.

At block S41, the execution module 303 determines whether a preliminary braking should be executed to the vehicle 100 according to the second related information. When the preliminary braking should be executed to the vehicle 100, the process goes to block S42. When the preliminary braking is not required to be executed to the vehicle 100, the process goes to block S43.

In one embodiment, when the second related information indicates that the brightness value of the environment in which the vehicle 100 is currently located is lower than a first preset value (e.g., 50 cd/m$^2$), and/or the visibility value of the environment in which the vehicle 100 is currently located is lower than a second preset value (for example, 100 m), the execution module 303 determines that the preliminary braking should be executed to the vehicle 100.

When the second related information indicates that the brightness value of the environment in which the vehicle 100 is currently located is greater than or equal to the first preset value, and the visibility value of the environment in which the vehicle 100 is currently located is greater than or equal to the second preset value, the execution module 303 determines that the preliminary braking is not required to be executed to the vehicle 100.

At block S42, the execution module 303 executes the preliminary braking on the vehicle 100.

In this embodiment, the executing of the preliminary braking to the vehicle 100 refers to increasing a hydraulic pressure of brake fluid (the brake fluid also called as brake fluid or pressure oil) of the vehicle 100, such that a brake disc and a brake pad of the vehicle 100 can contact with each other. It should be noted that if the preliminary braking is executed to the vehicle 100, the vehicle 100 can obtain better braking capability and reduce a required braking distance if the driver of the vehicle 100 depresses a brake pedal of the vehicle 100.

At block S43, the execution module 303 determines whether or not to execute braking on the vehicle 100 immediately according to the first related information.

In one embodiment, when the first related information indicates that the type of the road on which the vehicle 100 is currently located is the secondary road, the execution module 303 determines that braking of the vehicle 100 needs to be executed immediately, and the process goes to block S44. When the first related information indicates that the type of the road on which the vehicle 100 is currently located is the main road, the execution module 303 determines that it is not necessary to execute braking to the vehicle 100, and the process goes to block S45.

The reason for the determination that the braking of the vehicle 100 needs to be executed to the vehicle 100 when the first related information indicates the type of the road to be the secondary road, is that the traffic rule requires vehicles on the secondary road should decelerate and give way to vehicles on the main road at the intersection.

At block S44, when it is determined that the braking needs to be executed to the vehicle 100 immediately, the execution module 303 controls the vehicle 100 to brake. After block S44, the process goes to block S45.

At block S45, the determination module 302 determines whether a current speed value of the vehicle 100 equals 0. When the current speed value of the vehicle 100 is not equal to 0, the process goes to block S46. When the current speed value of the vehicle 100 is equal to 0, the process ends.

At block S46, the execution module 303 detects whether there is an object at the intersection using the detecting device 34, and controls the speed of the vehicle 100 according to a detection result of the detecting device 34 when the vehicle 100 passes through the intersection.

Specifically, when the detection result of the detecting device 34 indicates that there is an object at the intersection, the execution module 303 detects a distance S between the vehicle 100 and the object by using the detecting device 34. The execution module 303 further determines whether the vehicle 100 will collide with the object according to the distance S and the current speed value V of the vehicle 100. When it is determined that the vehicle 100 will not collide with the object, the execution module 303 controls the vehicle 100 to pass through the intersection at the current speed V. When it is determined that the vehicle 100 will collide with the object, the execution module 303 controls the vehicle 100 to decelerate before passing through the intersection.

When the detection result of the detecting device 34 indicates that there is no object at the intersection, the execution module 303 controls the vehicle 100 to pass through the intersection at the current speed value V.

In this embodiment, the determining of whether or not the vehicle 100 will collide with the object according to the distance S and the current speed value V of the vehicle 100 includes: calculating an estimated speed value V' according to the distance S and estimated transit time T, wherein $V'=S/T$; comparing the current speed value V of the vehicle 100 and the estimated speed value V'; determining that the vehicle 100 will collide with the object when V is greater than or equal to V'; or determining that the vehicle 100 does not collide with the object when V is less than V'.

In this embodiment, the execution module 303 can obtain the estimated transit time T from the high-precision map 39.

In one embodiment, when it is determined that the vehicle 100 will collide with the object, the execution module 303 controls the vehicle 100 to decelerate from the speed value V to a speed value V". The speed value V" is less than or equal to the V'.

In one embodiment, the execution module 303 further determines whether the vehicle 100 has passed through the intersection using the high-precision map 39. When the vehicle 100 has passed through the intersection, the execution module 303 adjusts the detecting range of the detecting device 34 from the second range to the first range.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A traffic safety control method applied to a vehicle-mounted device, the method comprising:
obtaining first related information of a road when a vehicle is travelling on the road, the first related information of the road comprising information indicated whether there is an intersection in front of the vehicle on the road, comprising: capturing an image of a scene in front of the vehicle on the road by using a detecting device; determining whether there is the intersection in front of the vehicle on the road according to a result of identification of whether the captured image comprising an image of a traffic light by using an image recognition algorithm;
in response that there is the intersection in front of the vehicle on the road, detecting a brightness value of an environment in which the vehicle is currently located by using a light sensor; and detecting a visibility value of the environment in which the vehicle is currently located by using a visibility sensor;
determining that a preliminary braking should be executed to the vehicle when the brightness value is lower than a first preset value, and/or the visibility value is lower than a second preset value; determining that the preliminary braking is not required to be executed to the vehicle when the brightness value is greater than or equal to the first preset value, and the visibility value is greater than or equal to the second preset value; and
in response that the preliminary braking should be executed to the vehicle, executing the preliminary braking on the vehicle.

2. The traffic safety control method according to claim 1, further comprising:
determining that there is the intersection in front of the vehicle on the road when the captured image comprises the image of the traffic light; or
determining that there is no intersection in front of the vehicle on the road when the captured image does not comprise the image of the traffic light.

3. The traffic safety control method according to claim 1, wherein the first related information of the road further comprises whether the intersection is an accident-prone intersection, the method further comprises:
in response that there is the intersection in front of the vehicle on the road, and the intersection is the accident-prone intersection, transmitting a warning by controlling a buzzer to generate a warning sound.

4. The traffic safety control method according to claim 1, wherein the first related information of the road further comprises that the road is a main road or a secondary road, and the method further comprises:
controlling the vehicle to brake in response that the road is the secondary road and a traffic rule requires vehicles on the secondary road should decelerate and give way to vehicles on the main road at the intersection.

5. The traffic safety control method according to claim 4, wherein the preliminary braking is executed to the vehicle by increasing a hydraulic pressure of brake fluid of the vehicle, such that a brake disc and a brake pad of the vehicle contact with each other, and the vehicle obtains better braking capability and reduces a required braking distance when a driver of the vehicle depresses a brake pedal of the vehicle.

6. The traffic safety control method according to claim 5, further comprising:
detecting whether there is an object at the intersection using the detecting device after executing the braking to the vehicle and a current speed (V) of the vehicle is greater than zero;
detecting a distance (S) between the vehicle and an object using the detecting device when there is the object at the intersection;
determining whether or not the vehicle will collide with the object according to the distance (S) and the current speed (V) of the vehicle;
controlling the vehicle to pass through the intersection at the current speed (V), when the vehicle will not collide with the object or there is no object at the intersection; and controlling the vehicle to decelerate before passing through the intersection when the vehicle will collide with the object.

7. The traffic safety control method according to claim 1, further comprising:
adjusting a detecting range of the detecting device from a first range to a second range in response that the intersection is determined to be in front of the vehicle on the road, the second range being wider than the first range; and
adjusting the detecting range of the detecting device from the second range to the first range when the vehicle has passed through the intersection.

8. A vehicle-mounted device comprising:
a storage device;
at least one processor; and
the storage device storing one or more programs, which when executed by the at least one processor, cause the at least one processor to:
obtain first related information of a road when a vehicle is travelling on the road, the first related information of the road comprising information indicated whether there is an intersection in front of the vehicle on the road, comprising: capturing an image of a scene in front of the vehicle on the road by using a detecting device; determining whether there is the intersection in front of the vehicle on the road according to a result of identification of whether the captured image comprising an image of a traffic light by using an image recognition algorithm;
in response that there is the intersection in front of the vehicle on the road, detect a brightness value of an environment in which the vehicle is currently located by using a light sensor; and detect a visibility value of the environment in which the vehicle is currently located by using a visibility sensor;
determine that a preliminary braking should be executed to the vehicle when the brightness value is lower than a first preset value, and/or the visibility value is lower than a second preset value; determine that the preliminary braking is not required to be executed to the vehicle when the brightness value is greater than or equal to the first preset value, and the visibility value is greater than or equal to the second preset value; and
in response that the preliminary braking should be executed to the vehicle, execute the preliminary braking on the vehicle.

9. The vehicle-mounted device according to claim 8, wherein the at least one processor is further caused to:
determine that there is the intersection in front of the vehicle on the road when the captured image comprises the image of the traffic light; or
determine that there is no intersection in front of the vehicle on the road when the captured image does not comprise the image of the traffic light.

10. The vehicle-mounted device according to claim 8, wherein the first related information of the road further comprises whether the intersection is an accident-prone intersection, the at least one processor is further caused to:
in response that there is the intersection in front of the vehicle on the road, and the intersection is the accident-prone intersection, transmit a warning by controlling a buzzer to generate a warning sound.

11. The vehicle-mounted device according to claim 8, wherein the first related information of the road further comprises that the road is a main road or a secondary road, and the at least one processor is further caused to:
control the vehicle to brake in response that the road is the secondary road and a traffic rule requires vehicles on the secondary road should decelerate and give way to vehicles on the main road at the intersection.

12. The vehicle-mounted device according to claim 11, wherein the preliminary braking is executed to the vehicle by increasing a hydraulic pressure of brake fluid of the vehicle, such that a brake disc and a brake pad of the vehicle contact with each other, and the vehicle obtains better braking capability and reduces a required braking distance when a driver of the vehicle depresses a brake pedal of the vehicle.

13. The vehicle-mounted device according to claim 12, wherein the at least one processor is further caused to:
detect whether there is an object at the intersection using the detecting device after executing the braking to the vehicle and a current speed (V) of the vehicle is greater than zero;
detect a distance (S) between the vehicle and an object using the detecting device when there is the object at the intersection;
determine whether or not the vehicle will collide with the object according to the distance (S) and the current speed (V) of the vehicle;
control the vehicle to pass through the intersection at the current speed (V), when the vehicle will not collide with the object or there is no object at the intersection; and
control the vehicle to decelerate before passing through the intersection when the vehicle will collide with the object.

14. The vehicle-mounted device according to claim 8, wherein the at least one processor is further caused to:
adjust a detecting range of the detecting device from a first range to a second range in response that the intersection is determined to be in front of the vehicle on the road, the second range being wider than the first range; and
adjust the detecting range of the detecting device from the second range to the first range when the vehicle has passed through the intersection.

15. A non-transitory storage medium having instructions stored thereon, when the instructions are executed by a processor of a vehicle-mounted device, the processor is configured to perform a traffic safety control method, wherein the method comprises:
obtaining first related information of a road when a vehicle is travelling on the road, the first related information of the road comprising information indicated whether there is an intersection in front of the vehicle on the road, comprising: capturing an image of a scene in front of the vehicle on the road by using a detecting device; determining whether there is the intersection in front of the vehicle on the road according to a result of identification of whether the captured image comprising an image of a traffic light by using an image recognition algorithm;
in response that there is the intersection in front of the vehicle on the road, detecting a brightness value of an environment in which the vehicle is currently located by using a light sensor; and detecting a visibility value of the environment in which the vehicle is currently located by using a visibility sensor;
determining that a preliminary braking should be executed to the vehicle when the brightness value is lower than a first preset value, and/or the visibility value is lower than a second preset value; determining that the preliminary braking is not required to be executed to the vehicle when the brightness value is greater than or equal to the first preset value, and the visibility value is greater than or equal to the second preset value; and in response that the preliminary braking should be executed to the vehicle, executing the preliminary braking on the vehicle.

16. The non-transitory storage medium according to claim 15, wherein the method further comprises:

determining that there is the intersection in front of the vehicle on the road when the captured image comprises the image of the traffic light; or determining that there is no intersection in front of the vehicle on the road when the captured image does not comprise the image of the traffic light.

17. The non-transitory storage medium according to claim 15, wherein the first related information of the road further comprises whether the intersection is an accident-prone intersection, the method further comprises:

in response that there is the intersection in front of the vehicle on the road, and the intersection is the accident-prone intersection, transmitting a warning by controlling a buzzer to generate a warning sound.

* * * * *